May 9, 1967 W. E. LEWIS 3,318,299
SELF-CLEANING OVEN WITH REMOVABLE PANELS
Filed Dec. 2, 1965
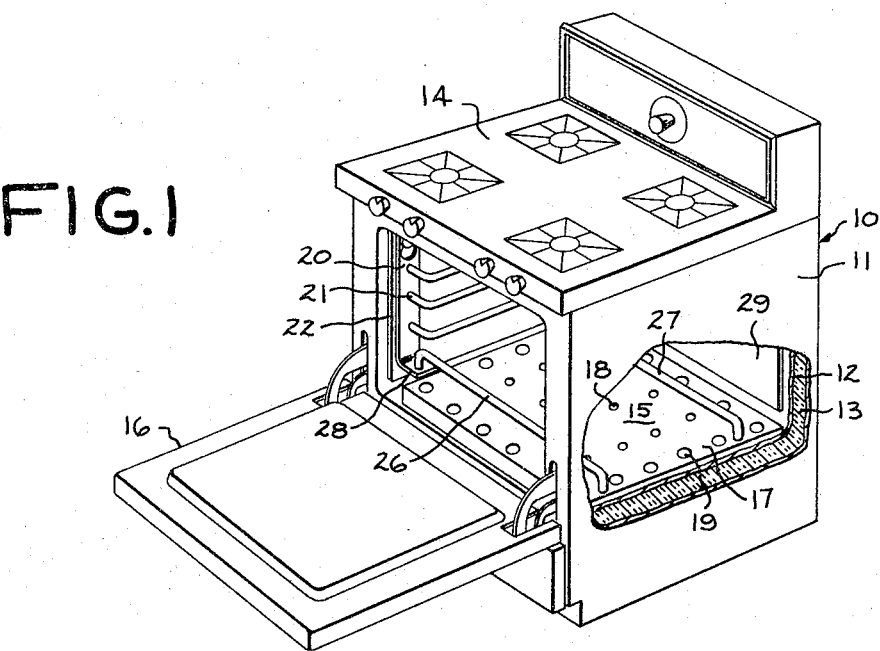
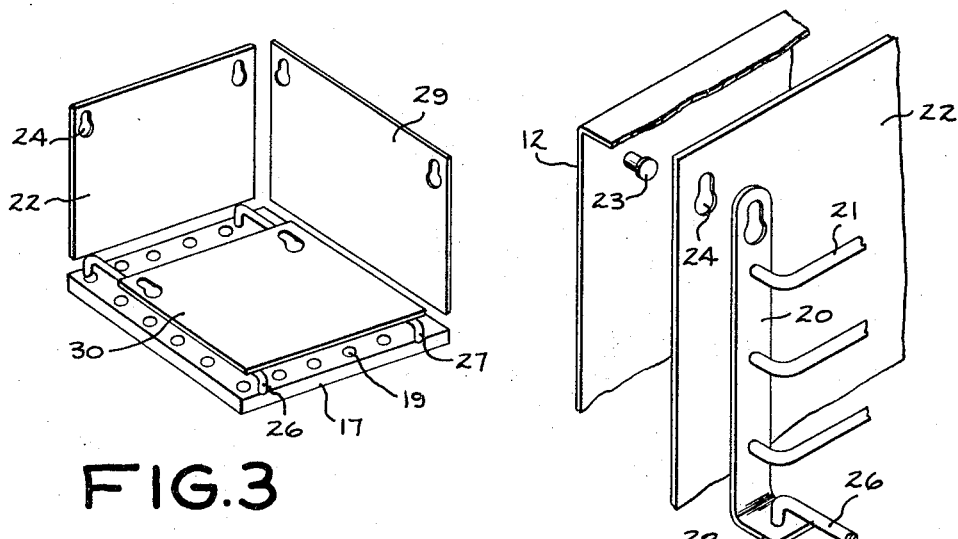
INVENTOR.
WALTER E. LEWIS
BY Richard L. Caslin
HIS ATTORNEY

United States Patent Office 3,318,299
Patented May 9, 1967

3,318,299
SELF-CLEANING OVEN WITH REMOVABLE
PANELS
Walter E. Lewis, Louisville, Ky., assignor to General
Electric Company, a corporation of New York
Filed Dec. 2, 1965, Ser. No. 511,074
6 Claims. (Cl. 126—19)

The present invention relates to cooking ovens and particularly to cooking ovens of the self-cleaning variety.

It has long been recognized that one of the most disagreeable domestic tasks which a housewife must undertake is that of cleaning the walls of a cooking oven of accumulated food soils. To make this task less burdensome, various oven cleaning compounds and oven cleaning techniques have come into use. For example, aerosol compounds are now available which may be sprayed onto the oven walls to loosen the food soils, after which the walls may be scoured by hand. Also available are ovens in which the liner of the oven cavity may be removed and cleaned or completely replaced. Electric ovens are also available in which the food soils are removed from the oven walls by raising the temperature in the oven cavity by means of heaters to a level far above the level of normal cooking temperatures. A basic patent in this art is that of Bohdan Hurko No. 3,121,158, which is assigned to the General Electric Company, the assignee of the present invention.

It is an object of this invention to provide an oven construction which will allow the use of a new low cost approach to the cleaning of ovens in which no cleaning compounds are used.

It is another object of the present invention to provide an oven construction in which the cleaning is carried out by using only the heating means needed to perform normal cooking operations.

It is a further object of the present invention to provide an oven construction which will, in a preferred embodiment, allow at least a portion of the oven to be cleaned during normal cooking operations.

To fulfill these and other objects, the present invention provides an oven having an oven cavity defined by the liner with a front opening that is adapted to be closed by an oven door. Included in the oven is an enlarged heating means for cooking food placed within the oven cavity. The liner is supplied with a plurality of removable panels which may be moved into a position closely adjacent the heating means so that the panel will be subjected to the intense surface heat generated during normal cooking operations. The temperature of the panel will thus be increased to the level above the maximum cooking temperatures where degradation of the food soils will occur.

While the specification concludes with claims particularly pointing out and distinctly claiming the present invention, the invention itself may be better understood by reference to the following detailed description read in conjunction with the accompanying drawing in which:

FIGURE 1 is a perspective view of a partially sectioned free-standing range having a gas oven constructed in accordance with the teachings of the present invention;

FIGURE 2 is a fragmentary perspective view of the supporting structure for the removable panels and oven racks of the present invention;

FIGURE 3 is a diagrammatic perspective view of certain of the oven elements showing one of the removable panels in an inverted horizontal position in which it will be cleaned during normal cooking operations.

Referring now to the drawing and particularly to FIGURE 1, there will be seen one type of cooking range into which an oven constructed in accordance with the teachings of the present invention may be incorporated. A free-standing range 10 includes a generally box-like outer cabinet 11 and a smaller box-like oven liner 12 surrounded by a layer 13 of a suitable heat insulating material. A cooktop 14 having a plurality of surface heating units or burners with suitable controls is located on top of the oven. Access is provided to an oven cavity 15 through an opening in the front of the oven, which opening is adapted to be closed by an insulated oven door 16. The range structure described thus far is more or less conventional and is mentioned here to outline the environment in which the present invention is found.

The oven cavity 15 is heated by a plate-like gas burner 17 having a plurality of orifices 18 in its upper surface. This burner is enlarged over standard burners, and it has a generally uniform radiation activity thereacross. Of course, electrical resistance heating elements could be devised to fulfill the same heating function. Gases flowing through these orifices from a common supply chamber (not shown) within the burner are ignited to provide cooking heat. Since the orifices 18 in the central portion of the burner surface are uniformly arranged, the ignited gas creates a generally uniform temperature zone over all of the burner surface except the burner periphery. As is evident in FIGURE 1, the orifices 19 located near the periphery are larger than the orifices 18 in the central portion so that the generated heat at the periphery is greater than the heat over the central portion, just as the size of the peripheral gas flames is greater than the size of the central gas flames. This causes a curtain of flame to surround the panel being cleaned so the smoke generated may be consumed by combustion as will be further explained hereinafter.

Containers of food to be cooked in the oven cavity are to be placed on the standard oven racks which are not illustrated in the drawings for the sake of simplicity. Such racks in turn are supported along their side edges by rack supports or hangers of ladder-like configuration formed by a parallel pair of vertical support members 20 which are joined by two or more horizontal bars 21. As may best be seen in FIGURE 2, the support members 20 do not rest directly upon the oven liner 12, but instead upon a removable panel 22 made of a suitable metallic material that has a high temperature resistant finish. There is a pair of side panels 22 as well as a back panel 29 to form walls that are exposed to the grease-laden fumes and splattering which accompany normal cooking operations. Each of the panels is suspended from projections or studs 23 on the inner surfaces of the oven liner 12, which studs extend through keyhole slots 24 formed near the upper edge of the panels. Each of the support members 20 is similarly suspended from a stud 23 which also extends through a keyhole slot 25 near the upper end of the member 20.

As in any other oven, the removable panels 22, 22 and 29 forming a protection for the vertical walls of the oven liner 12, must be periodically cleaned of the food soils which accumulate on their surfaces. The number of removable panels normally exceeds by one the number of panels needed to cover the vertical walls of the oven liner. The panel not being used to cover the liner is placed with its soiled surface down over the burner 17 on a pair of supporting rods 26 and 27 as is seen in FIGURE 3. These rods are anchored at their ends or inturned flanges 28 formed at the lower end of the rack support members 20 as is seen in FIGURE 1. The surface of panel 30, upon which the food soils have accumulated, faces the upper surface of burner 17 and is subjected to the high temperatures which exist at the burner surface during normal cooking operations. The food soils on the panel are partially degraded by these high temperatures and vaporize into smoke which, due to natural air convection, begins to flow into the oven cavity from beneath the panel 30. It is to eliminate this smoke that the larger peripheral orifices 19 have been provided. Gas ignited at these orifices not only causes higher temperatures at the periphery but also creates a curtain of flame through which the smoke must pass. Complete degradation of the smoke occurs in this curtain of flame.

As each of the removable panels is interchangeable, panel 30 may be exchanged for a soiled panel which will then be placed on the rods 26 and 27 with its soiled surface toward burner 17. During subsequent cooking operations, this panel will be cleaned in the same manner as was panel 30.

While the preferred embodiment of the invention is disclosed and described in detail herein, it is obvious that many alterations and modifications will occur to those skilled in the art. For instance, it is obvious that the oven may be used in built-in or drop-in ranges as well as in free-standing ranges. Similarly, the gas burner may be replaced by an electric heating unit having comparable heat distribution characteristics.

It is therefore intended that the following claims cover all modifications which are within the true spirit and scope of the invention.

What I claim as new and desire to secure by Letters Patent of the United States is:

1. A baking oven including walls forming an oven cavity defined by a box-like oven liner with a front opening that is adapted to be closed by an oven door, an enlarged heating means of rectangular configuration with generally uniform radiation activity thereacross for cooking food placed within the cavity, a plurality of removable wall panels supported from the oven liner, said panels being relatively movable such that at least one panel at a time may be placed in an inverted position in an area of intense heat existing immediately adjacent the enlarged heating means whereby the temperature of the inverted panel may be elevated to levels above the maximum cooking temperatures so that accumulated food soils on the panel will be transformed into gaseous degradation products, said enlarged heating means having a rectangular configuration at least as large as the configuration of the largest panel.

2. An oven as recited in claim 1 wherein the number of relatively movable panels exceeds by at least one the number needed to form a complete protective means for the walls of an oven liner, and in which a soiled protective panel may be interchanged with a cleaned panel previously positioned adjacent the heating means.

3. An oven as recited in claim 2 wherein each of the removable panels forming the liner protection is independently supported from an adjacent wall of the oven liner.

4. An oven as recited in claim 1 wherein the said enlarged heating means comprises a plate-like gas burner, said burner including a chamber therein adapted to receive a fuel to be burned, and a plurality or orifices distributed over one of its planar surfaces, those orifices at the periphery of the planar surface being larger than the others so as to generate a curtain of intense heat around the periphery of the panel for consuming the smoke that is given off by the degradation process.

5. A domestic oven comprising an oven body having an insulated oven liner and an access door that forms an oven cooking cavity, heating means for said cavity including a gas burner located adjacent the bottom portion of the oven cavity, removable metal panels covering at least the two side walls and the back wall of the oven liner so that the panels will protect the underlying surfaces of the oven liner from being soiled by food drippings and grease spatterings, and means for cleaning the food soil from each panel, said means comprising structure for supporting a panel in an inverted position over the gas burner for burning off the food soil, and an extra panel member replacing the panel being cleaned in the protective position supported from the oven liner, said panels being interchanged in position until all of the panels have been cleaned in succession.

6. A baking oven including a generally box-like outer cabinet, a generally box-like oven liner spaced from said outer cabinet by a layer of heat insulating material, said oven liner having at least two inwardly extending projections at the top of each of its vertical planar surfaces, an enlarged heating means of rectangular configuration with generally uniform radiation activity thereacross being disposed within said oven liner, a plurality of removable panels forming a protection for the oven liner and having apertures for receiving the projections on the adjacent planar surface of the oven liner, rack supports of ladder-like configuration having apertured members for receiving the projections of the opposite side walls of the oven liner, and a panel supporting structure located slightly above the said enlarged heating means so that each of said removable panels may be placed in a zone of intense heat existing immediately adjacent the heating means whereby the temperature of the panel may be elevated above the maximum cooking temperatures to levels at which food soils on the panel will be transformed into gaseous degradation products.

References Cited by the Examiner

UNITED STATES PATENTS

| | | | |
|---|---|---|---|
| 2,910,566 | 10/1959 | Smith | 126—39 |
| 3,120,224 | 2/1964 | Divelbiss | 126—39 |
| 3,145,289 | 8/1964 | Swetlitf | 126—39 |

FREDERICK L. MATTESON, JR., *Primary Examiner.*

E. G. FAVORS, *Assistant Examiner.*